US012139849B2

(12) United States Patent
Kennelly

(10) Patent No.: US 12,139,849 B2
(45) Date of Patent: Nov. 12, 2024

(54) WINCH LINE FOR SOFT SHACKLING

(71) Applicant: TAP Worldwide, LLC, Compton, CA (US)

(72) Inventor: Ryan Kennelly, Chula Vista, CA (US)

(73) Assignee: Wheel Pros LLC, Greenwood Village, CO (US)

( * ) Notice: Subject to any disclaimer, the term of this patent is extended or adjusted under 35 U.S.C. 154(b) by 258 days.

(21) Appl. No.: 17/858,297

(22) Filed: Jul. 6, 2022

(65) Prior Publication Data

US 2023/0024630 A1 Jan. 26, 2023

Related U.S. Application Data

(60) Provisional application No. 63/221,414, filed on Jul. 13, 2021.

(51) Int. Cl.

| | |
|---|---|
| ***D07B 1/00*** | (2006.01) |
| ***B66D 1/28*** | (2006.01) |
| ***D07B 1/02*** | (2006.01) |
| ***D07B 1/18*** | (2006.01) |

(52) U.S. Cl.

CPC ............... *D07B 1/185* (2013.01); *B66D 1/28* (2013.01); *D07B 1/02* (2013.01); *D07B 2201/1096* (2013.01)

(58) Field of Classification Search

CPC .. D07B 1/185; D07B 1/02; D07B 2201/1096; B66D 1/28; B66D 1/22

See application file for complete search history.

(56) References Cited

U.S. PATENT DOCUMENTS

| | | | | | |
|---|---|---|---|---|---|
| 3,204,519 | A * | 9/1965 | Lawson | D07B 1/185 87/8 |
| 3,537,742 | A * | 11/1970 | Black | D07B 1/185 57/22 |
| 3,583,749 | A * | 6/1971 | Hopkins | D07B 1/185 294/82.11 |
| 3,854,767 | A * | 12/1974 | Burnett | F16G 11/14 124/90 |
| 4,036,101 | A * | 7/1977 | Burnett | F16G 11/14 87/8 |
| 4,058,049 | A * | 11/1977 | Bech | F16G 11/146 87/8 |
| 4,414,799 | A * | 11/1983 | Alexander | D07B 7/182 87/8 |
| 4,974,488 | A * | 12/1990 | Spralja | D04C 1/12 87/8 |
| 5,699,657 | A * | 12/1997 | Paulson | D07B 1/185 57/22 |

(Continued)

FOREIGN PATENT DOCUMENTS

| | | | | |
|---|---|---|---|---|
| FR | 2893378 A1 * | 5/2007 | D07B 1/185 |
| JP | 5338018 B1 * | 11/2013 | A01K 27/003 |
| WO | WO-2005085518 A2 * | 9/2005 | D07B 1/00 |

*Primary Examiner* — Emmanuel M Marcelo
(74) *Attorney, Agent, or Firm* — Eric Hanscom

(57) ABSTRACT

A hookless winch rope for securing to an object includes a first rope having a first end and a second end. The first end has a first loop and comprising a choke. A second rope is separate from the first rope. The second rope includes a third end and a fourth end. The third end includes an enlarged knot forming an engagement notch receiving the first loop. The first rope and the second rope are joined by a first interwoven portion.

17 Claims, 12 Drawing Sheets

(56) References Cited

U.S. PATENT DOCUMENTS

| | | | | |
|---|---|---|---|---|
| 6,575,072 | B2 * | 6/2003 | Pellerin | B63B 21/20 87/8 |
| 7,306,417 | B2 * | 12/2007 | Dorstewitz | B60P 7/0823 410/97 |
| 8,689,534 | B1 * | 4/2014 | Chou | B21L 11/00 D11/12 |
| 8,713,905 | B1 * | 5/2014 | Branscomb | D07B 7/18 57/22 |
| 9,145,280 | B2 * | 9/2015 | Yale | B66C 1/12 |
| D743,640 | S * | 11/2015 | Byrne | D30/160 |
| D744,175 | S * | 11/2015 | Byrne | D30/160 |
| 9,296,593 | B2 * | 3/2016 | Yale | D07B 1/18 |
| 9,340,925 | B2 * | 5/2016 | Mozsgai | D07B 1/185 |
| 9,573,661 | B1 * | 2/2017 | Plaia | B63B 21/20 |
| 10,036,119 | B1 * | 7/2018 | Hall | D07B 1/145 |
| 11,965,288 | B2 * | 4/2024 | De Jager | D07B 5/005 |
| 2021/0086873 | A1 * | 3/2021 | Barnes | D07B 5/005 |
| 2024/0076830 | A1 * | 3/2024 | Pavel | B66C 1/122 |

* cited by examiner

WINCH LINE FOR SOFT SHACKLING

CROSS-REFERENCE TO RELATED APPLICATION

This claims the benefit of U.S. Provisional Application No. 63/221,414, filed on Jul. 13, 2021. The entire disclosure of the above application is incorporated herein by reference.

FIELD

The present disclosure relates to a winch and, more particularly, to a line that allows soft shackling.

BACKGROUND

This section provides background information related to the present disclosure which is not necessarily prior art.

Winches are used for many purposes. Winches have a drum that rotates to tighten a line or cable attached thereto. The drum, upon rotation, pulls the cable or rope and winds the cable or rope around the drum.

One use for a winch is in off-roading. Off-road vehicles may be placed in difficult positions due to the terrain. To remove the vehicle from the difficult position, a winch may be used to pull the vehicle in a desired direction and out of the difficult position so the vehicle can continue travelling. When in an undesirable position, the rope or cable is secured around a stationary object and the winch rotates to pull the vehicle in the desired direction. The winch may also be used to pull another vehicle from an undesirable position. When winching, shackles or hooks are attached to the line. Should components not be fully secured the hooks or shackles become dangerous objects. When the line is metal, the breaking of the line can cause to line to be unexpectedly released which may be potential for injury. Damage to the winch may also occur. Damage to those components may render the winch unusable. Therefore, prevention of damage to the winch is also desirable.

SUMMARY

This section provides a general summary of the disclosures, and is not a comprehensive disclosure of its full scope or all of its features.

The present disclosure provides a hookless winch rope that is effective without the use of numerous metal components typically associated with winching.

In a first aspect of the disclosure, a hookless winch rope for securing to an object includes a first rope having a first end and a second end. The first end has a first loop and comprising a choke. A second rope is separate from the first rope. The second rope includes a third end and a fourth end. The third end includes an enlarged knot forming an engagement notch receiving the first loop. The first rope and the second rope are joined by a first interwoven portion.

In another aspect of the disclosure, a hookless winch rope for securing to an object includes a first rope has a first end and a second end. The hookless winch rope further comprises a second rope separate from the first rope. The second rope comprises a third end and a fourth end. The first end is coupled to the third end with an enlarged knot. The fourth end includes a first loop integrally formed therein. The loop forms an opening with the object therein. The first loop is retained on the enlarged knot.

In yet another aspect of the disclosure, a hookless winch rope includes a unitary portion and a first portion and second portion extending from the unitary portion. The first portion and second portion form a first loop by threading the first portion into the second portion at a first intersection. The first portion form a second loop by threading the second portion into the first portion at a second intersection. The first portion and the second portion form a third loop be a knot formed by tying the first portion and the second portion. The enlarged knot forms a retaining notch by engaging the first intersection or the second intersection at the retaining notch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

Corresponding reference numerals indicate corresponding parts throughout the several views of the drawings.

DETAILED DESCRIPTION

Examples will now be described more fully with reference to the accompanying drawings. Although the following description includes several examples of a sport utility vehicle, it is understood that the features herein may be applied to any appropriate vehicle, such as motorcycles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1:
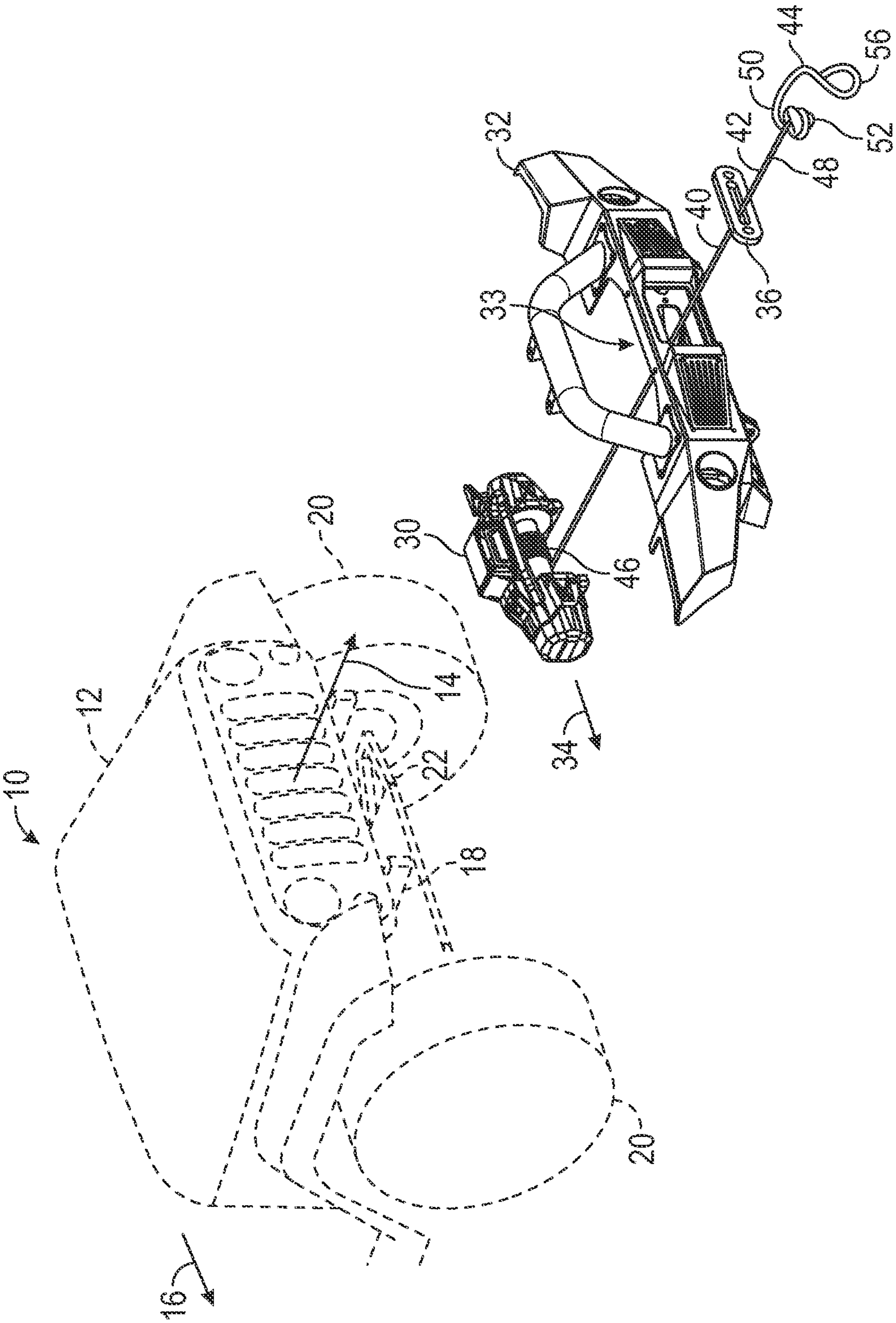
FIG. 1 is a perspective view of a vehicle having a winch according to the present disclosure.

Referring now to FIG. 1, a vehicle 10 has a vehicle body 12 that has a longitudinal axis 14 illustrated by the dot within FIG. 1. The longitudinal axis 14 extends outward from plane of the page. The vehicle body 12 also includes a lateral axis 16 that runs side to side across the vehicle. Lateral axis 16 is illustrated with arrows extending from the vehicle body 12. The vehicle body 12 is mounted to a frame 18. The frame 18 supports the vehicle body 12 and supports the wheels 20. The wheels 20 are coupled to a suspension 22 that allows the wheels 20 to move relative to the frame 18. A winch 30 is illustrated mounted to a bumper 32 or directly to the frame 1R The bumper 32 may be made to receive the winch 30 at least partially within an opening 33 of the bumper 32. As mentioned above, the winch 30 may be used for pulling other vehicles or the vehicle 10 from an undesirable position.

The vehicle 10 is generally orientated so that the front of the vehicle 10 is in a plane that is normal or perpendicular to the longitudinal axis 14. As will be described in more detail below, a winch 30 has a longitudinal axis 34 that is parallel to the lateral axis 16 of the vehicle and is perpendicular to the longitudinal axis 14 of the vehicle 10.

A fairlead 36 may be attached to the bumper 32 and receive and guide the rope or cable from the winch 30. The fairlead 36 is an optional part.

A hookless winch rope 40 is illustrated. The hookless winch rope 40 together with the winch 30 form a winch system. The hookless winch rope 40 is formed from by an assembly of a first rope 42 and a second rope 44. The first rope 42 has a first end 46 that is coupled to the winch 30. A second end 48 of the first rope 42 is coupled to a third end 50 of the second rope 44 at an enlarged knot 52. A first end 54 of the second rope 44 has a loop 56 disposed thereon.

Figure 2:
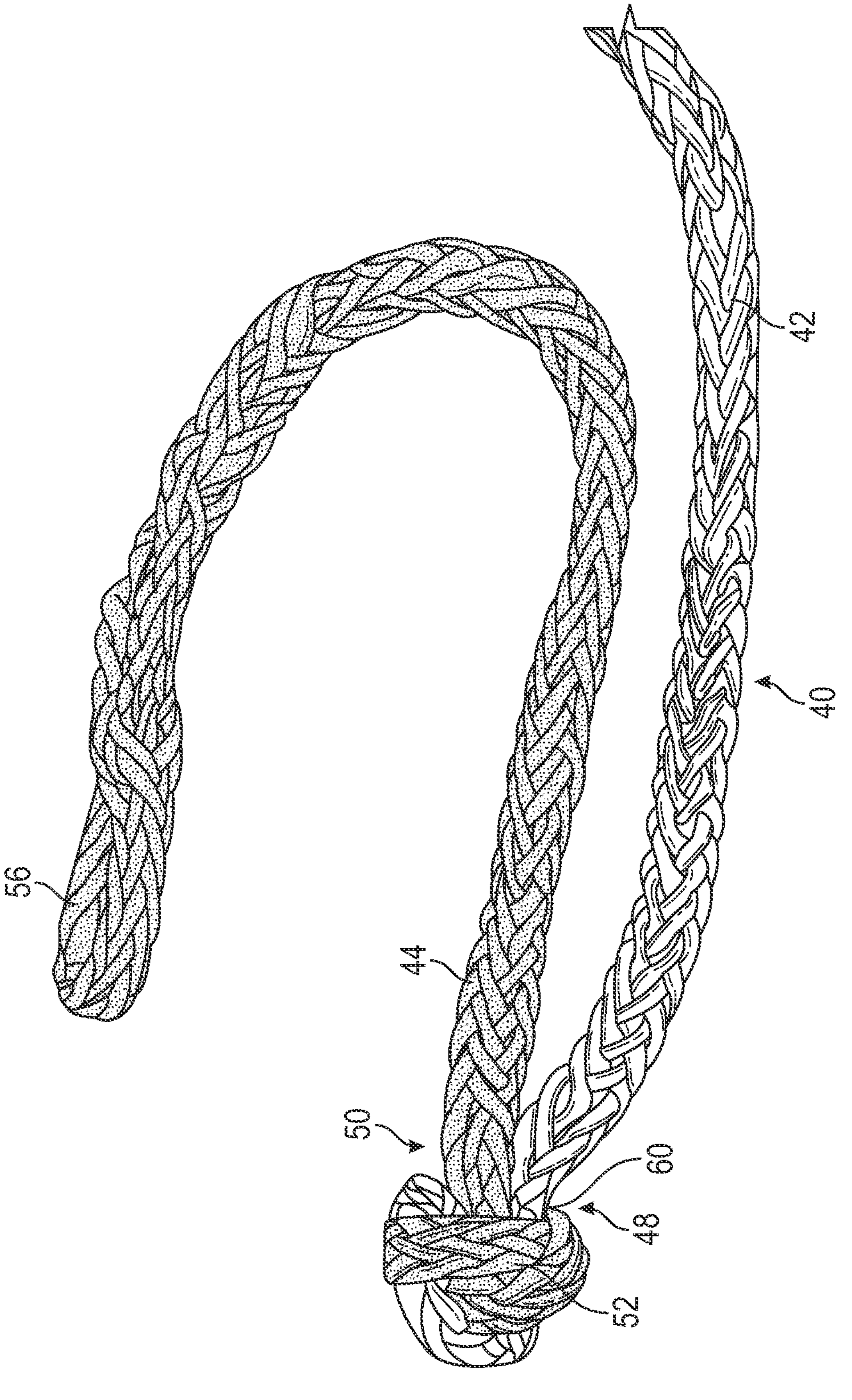
FIG. 2 is a side view of the enlarged knot and the first and second rope with the loop 56.

Referring now to FIG. 2, the first rope 42 is illustrated relative to the second rope 44. The enlarged knot 52, in this example, is a button knot. The first rope 42 and the second rope 44 may be formed of the same material. One suitable example of a material is a high molecular weight polyethylene (HMPE). Other suitable materials may include polypropylene, polybenzobisoxazole, Dacron®, polyester and polyamide. The materials may be UV stabilized as well. The first rope 42, as illustrated, is also braided. The second rope 44 is also braided. In FIG. 2, the second end 48 of the first rope 42 is illustrated. When the enlarged knot 52 is formed with the third end 50 of the rope 44, the second rope 44 extends from the enlarged knot 52 in the same direction as the longitudinal direction of the first rope 42. The first rope 42 is adjacent the second rope 44. That is, the second rope 44 extends from the knot toward the second end 48 of the first rope 42.

The loop 56 is also braided into the second rope 44. This increases the strength of the hookless winch rope 40 when the first rope 42 and second rope 44 are assembled together.

Figure 3:
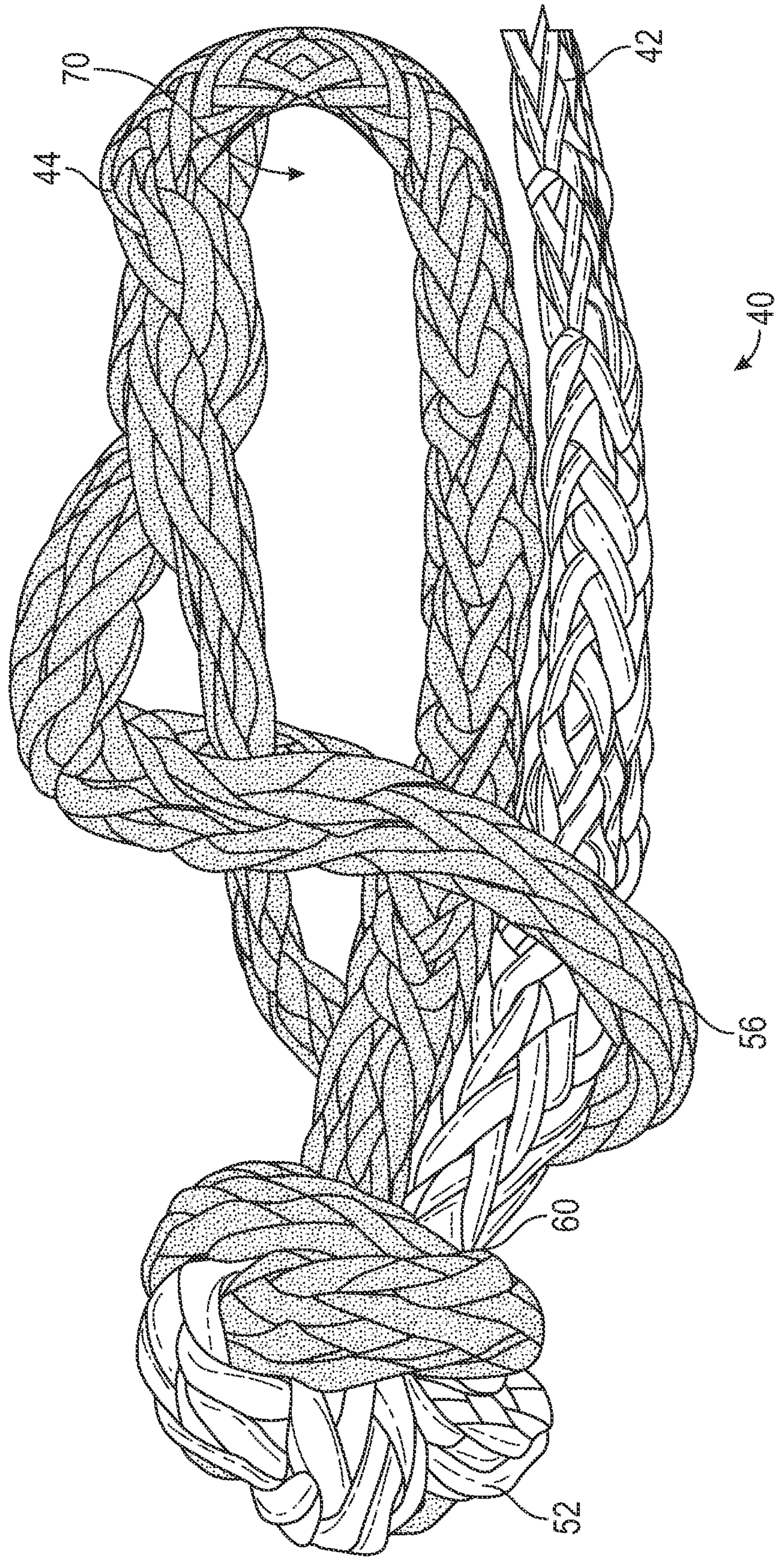
FIG. 3 is a partially assembled hookless winch is illustrated with the loop onto the enlarged knot 52.

Referring now to FIG. 3, the loop 56 is illustrated partially assembled over the enlarged knot 52. The loop may be placed in a twisted manner over the enlarged knot 52. A twisted loop 56 is illustrated in FIG. 3.

Figure 4:
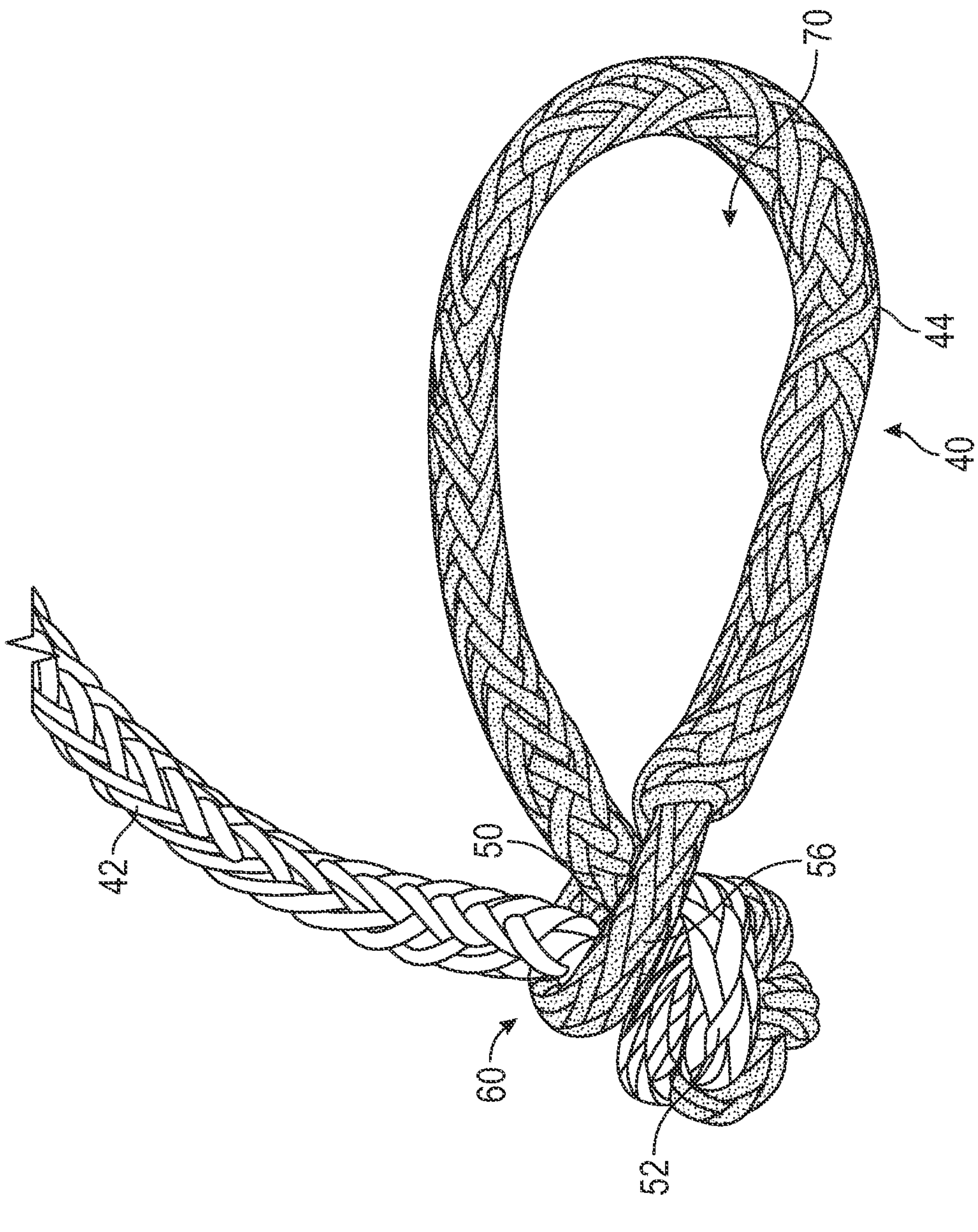
FIG. 4 is a side view of the loop 56 engaged with the retaining notch prior to pulling.

Referring now to FIG. 4, a retaining notch 60 has the loop secured thereto. The loop 56 generally extends around the third end 50 of the second rope 44 and the second end 48 of the first rope 42. The loop 56 is thus engaged with the retaining notch 60. The retaining notch 60 is generally V-shaped and is formed between the second end 48 of the first rope and the enlarged knot 52.

Figure 5:
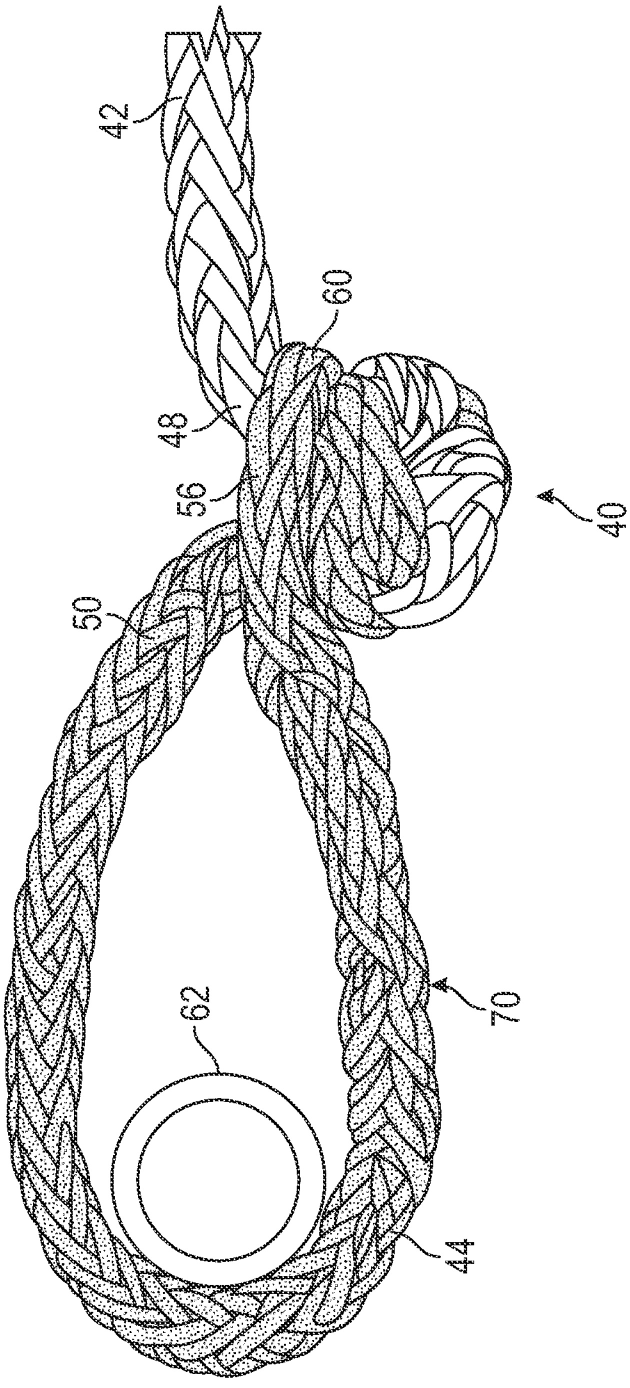
FIG. 5 is a side view of the loop 56 engaged with the retaining notch in a pulling position.

Referring now to FIG. 5, when the hookless winch rope 40 is used for pulling, the third end 50 is pulled away from the second end 48 of the first rope 42. A loop 70 is formed around an object 62 by the second rope 44. The object 62 may be a tree, a part of another vehicle or another type of structure. This allows the winching action to take place. The loop 70 presses against the object 62 when tension is placed on the hookless winch rope 40. The forces on the first rope 42 force the loop 56 into the retaining notch 60.

Figure 6:
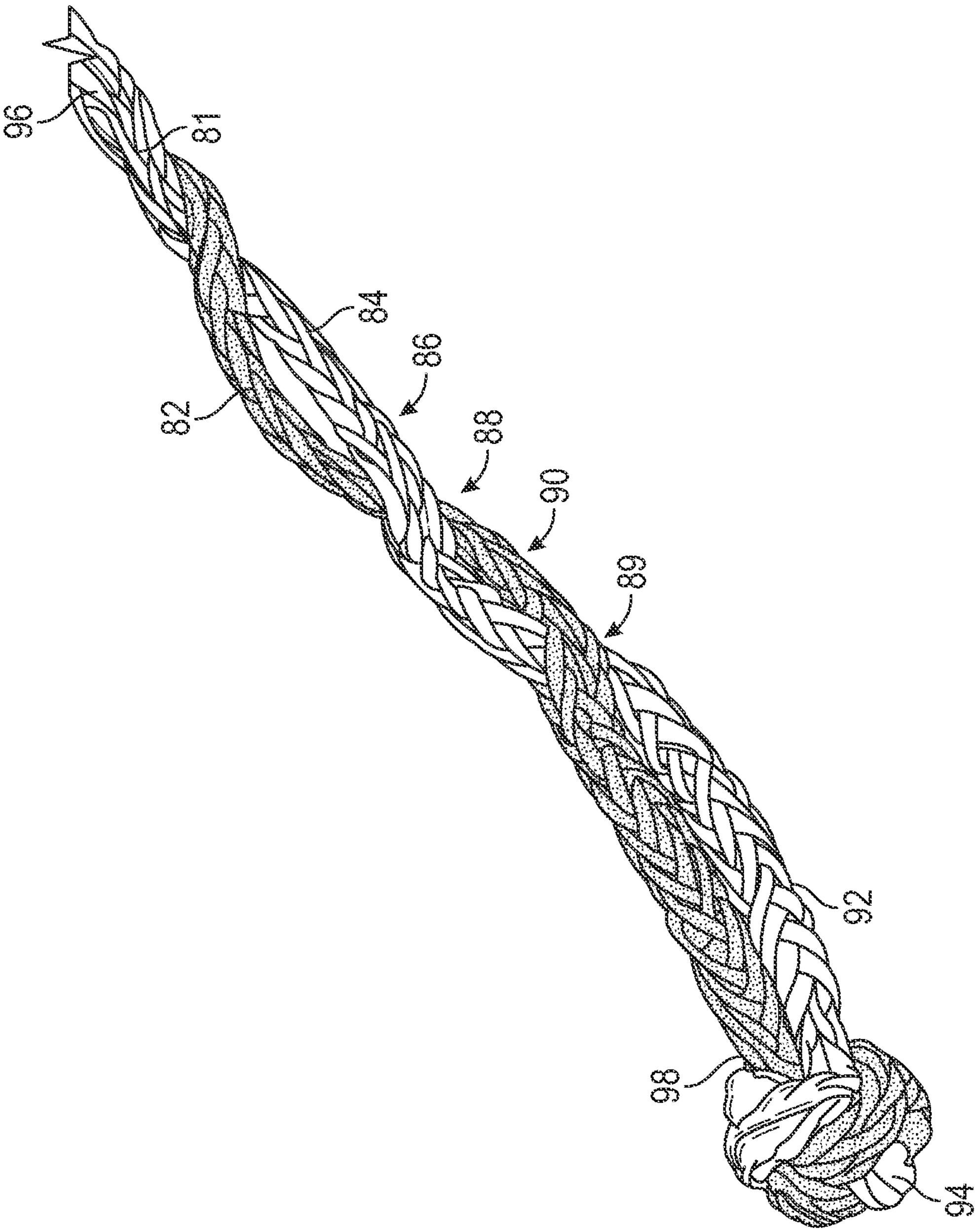
FIG. 6 is a hookless winch rope that has integral loops and an enlarged knot at the end thereof.

Referring now to FIG. 6, in a second example, a rope 80 has a unitary portion 81 that branches into a first portion 82 and a second portion 84. The first portion 82 and the second portion 84 are woven together at the unitary portion 81. That is, the first portion 82 forms a portion of the entire rope 80 while the second portion 84 also forms part of the rope 80. In this example, the first portion 82 and the second portion 84 form a first loop 86 by threading the first portion 82 through the second portion 84. Thus, an intersection 88 is formed. A second loop 90 is formed by threading the second portion 84 into the first portion 82.

A third loop 92 is formed by forming an enlarged knot 94 at the ends of the first portion 82 and the second portion 84. It should be noted that the rope 80 has a first end 96 and a second end 98. The second end 98 has the enlarged knot 94 formed therein. The enlarged knot 94 may also be a button knot as described above.

Figure 7:
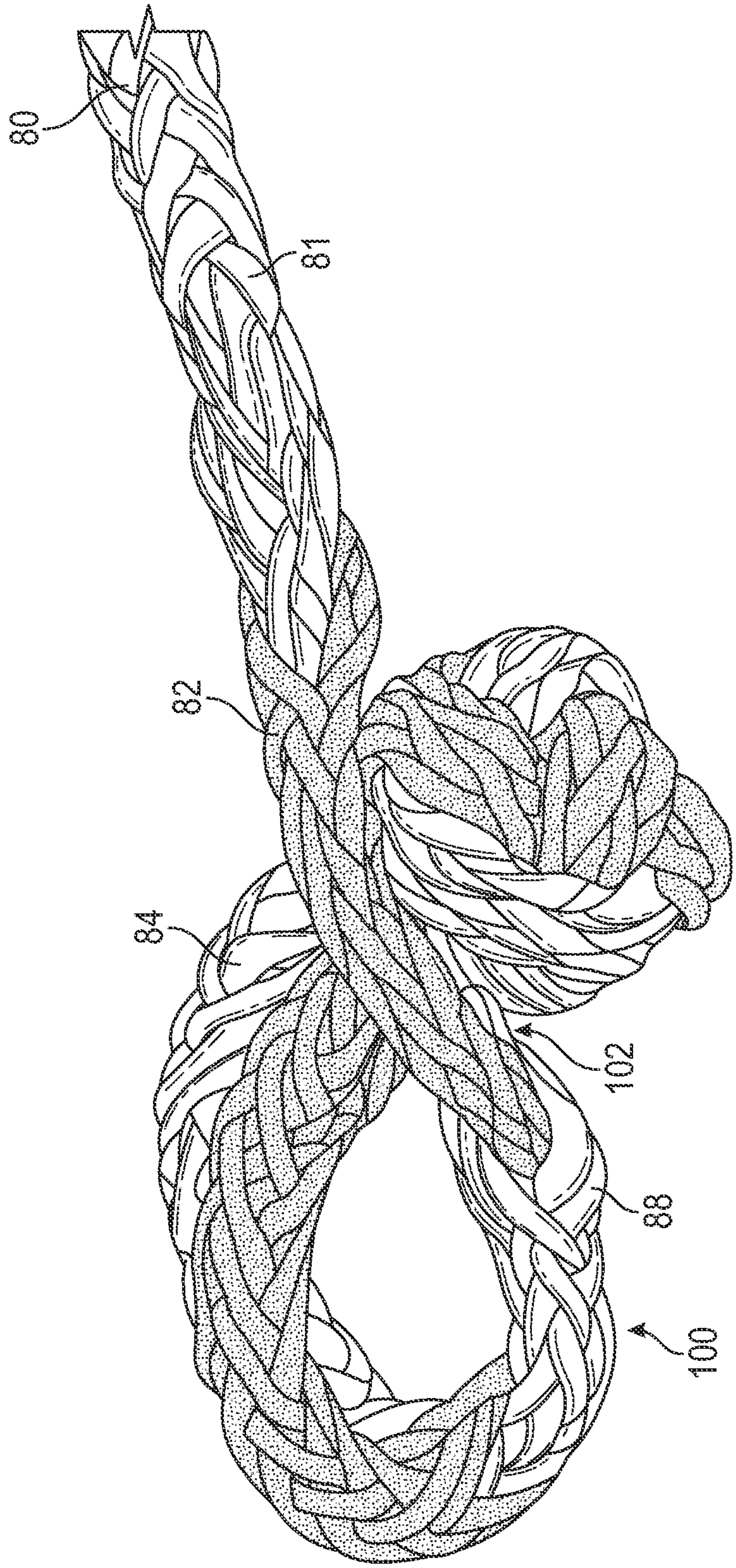
FIG. 7 is a side view of the rope 80 engaged within a loop of the rope with the retaining notch engaged at the enlarged knot.

Referring now to FIG. 7, a loop 100 is formed by securing the enlarged knot 94 into the first loop 86 or the second loop 90. A retaining notch 102 is used to receive one of the intersections 88, 89 of the first portion 82 and the second portion 84. The first portion 82 and the second portion 84 are in slidable engagement with each other at the intersections 88, 89

The loop 100 is formed around some type of object so that winching from the first end 96 of the rope may be performed.

Figure 8:
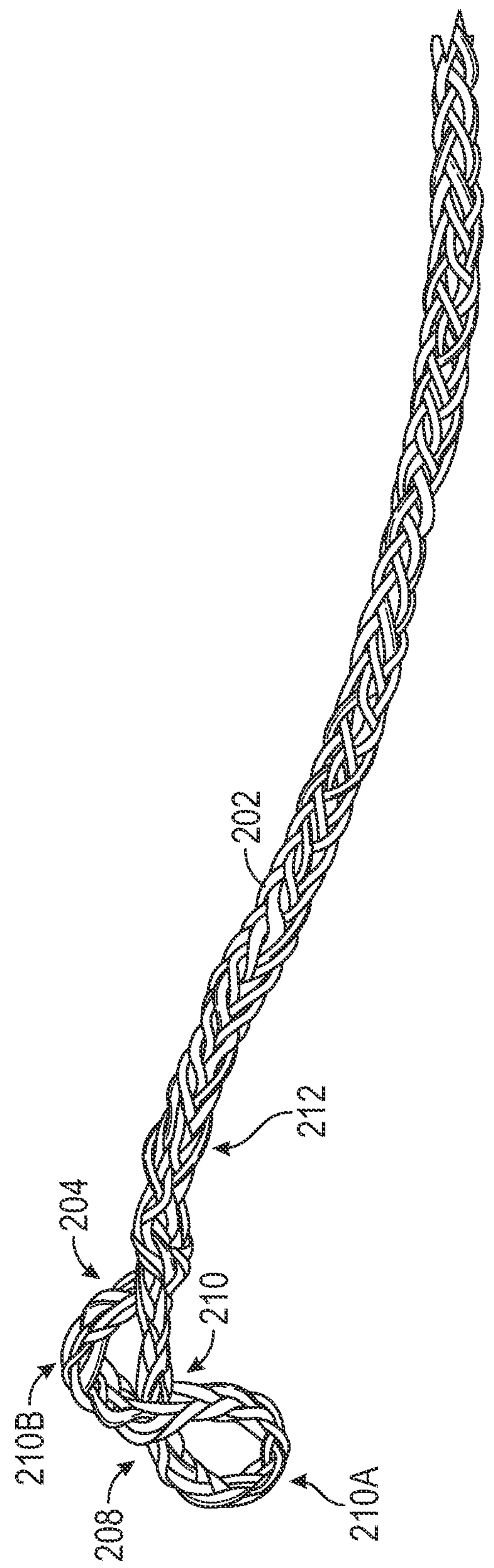
FIG. 8 is an elevation view of a first rope having a loop and a choke at a first end.

Referring now to FIG. 8, a third example of a hookless winch rope 200 has a first rope 202 having a first end 204 and a second end 206. The first end 204 has a loop 208 disposed therein. The loop 208 may be formed by an eye splice which means the end of the rope is looped around and is interwoven with the rest of the rope to form a loop therein. The loop 208 may also have a choke 210 disposed therein. The choke 210 is formed by the loop 208 wherein the one end of the rope is threaded through the other end of the rope prior to form the loop 208 by an eye splice. The choke 210 has a first portion 210A and a second portion 210B. The first portion 210A is used for securing the rope around an elongated knot as will be described in more detail below.

Figure 9:
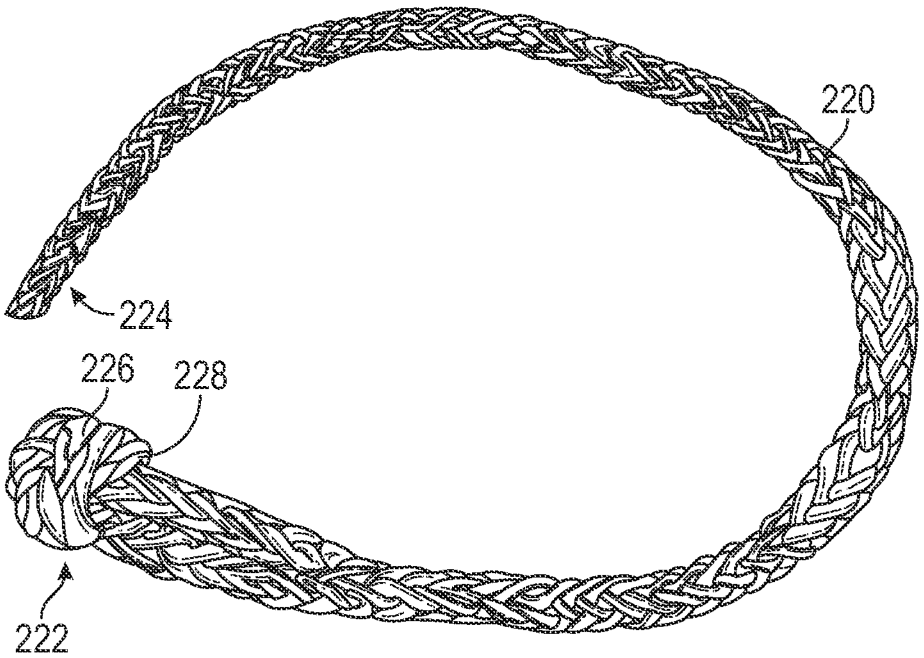
FIG. 9 is a second rope that has an eye splice and a button knot formed in a third end therein.

Referring now to FIG. 9, a second rope 220 of the hookless winch rope 200 is illustrated. The second rope 220 has a third end 222 and a fourth end 224. The third end 222 has an enlarged knot 226 formed therein. The enlarged knot 226 has a retaining notch 228 formed between the enlarged knot 226 and the second rope 220. A suitable example of an enlarged knot 226 comprises a button knot.

Adjacent to the enlarged knot 226, a loop 230 may formed into the second rope 220. The retaining notch 228 may therefore be adjacent to the loop 230. The loop 230 may formed by an eye splice directly adjacent to the retaining notch 228.

The eye splice that forms the loop 230 may be formed by an interwoven portion 232. The interwoven portion 232 may be thickened compared to the remaining portions of the second rope 220. An interwoven portion 212 may be formed adjacent to the loop 208 in the first rope 202 in the same manner. The interwoven portions 212, 232 may be various lengths depending upon the type of rope and the amount of pulling forced desired for the rope. That is, the interwoven portions 212, 232 may extend a distance corresponding to an amount of desired pulling force on the winching rope 200.

Figure 10:
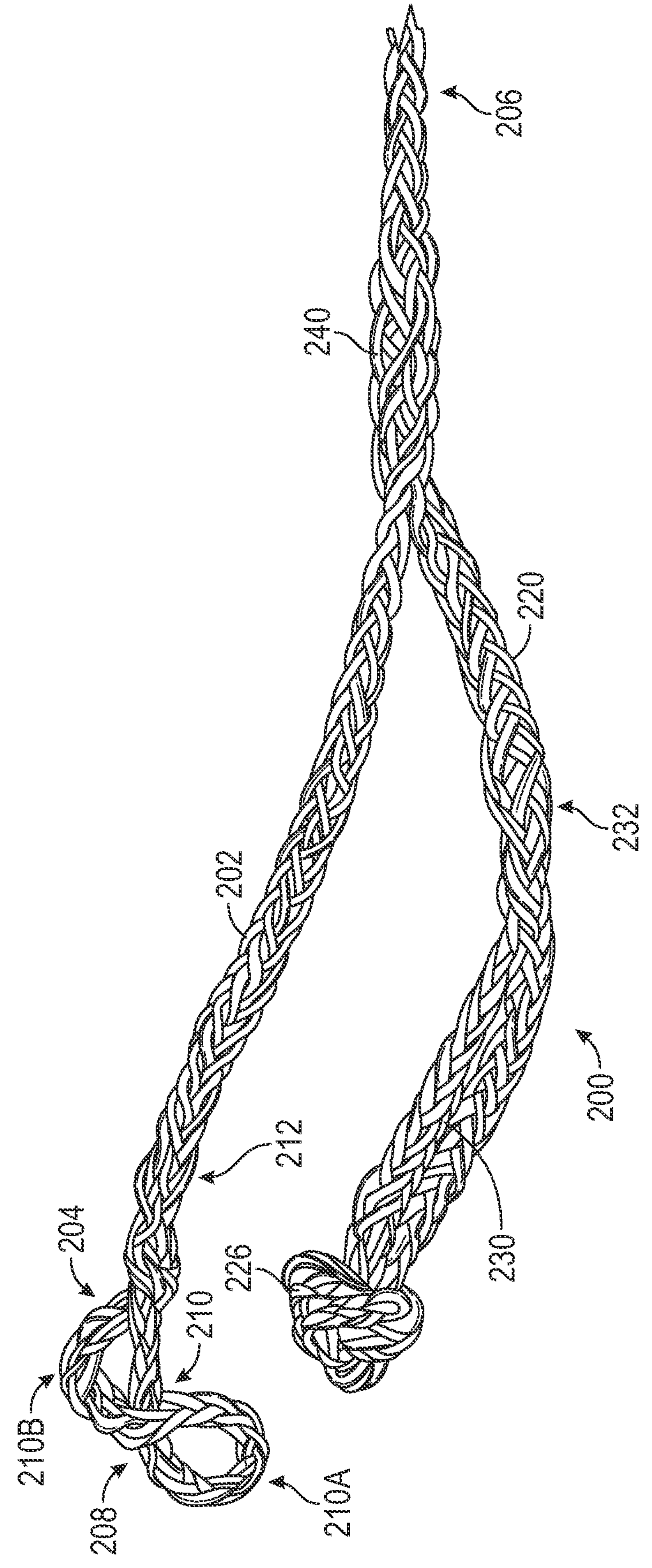
FIG. 10 is the winch rope having the second rope of FIG. 9 woven into the first rope of FIG. 8.

Referring now to FIG. 10, an interwoven portion 240 interweaves the first rope 202 and the second rope 220. Again, the amount of the interwoven portion 240 is an amount that corresponds to the desired amount of pull and may change depending upon the materials used.

Figure 11:
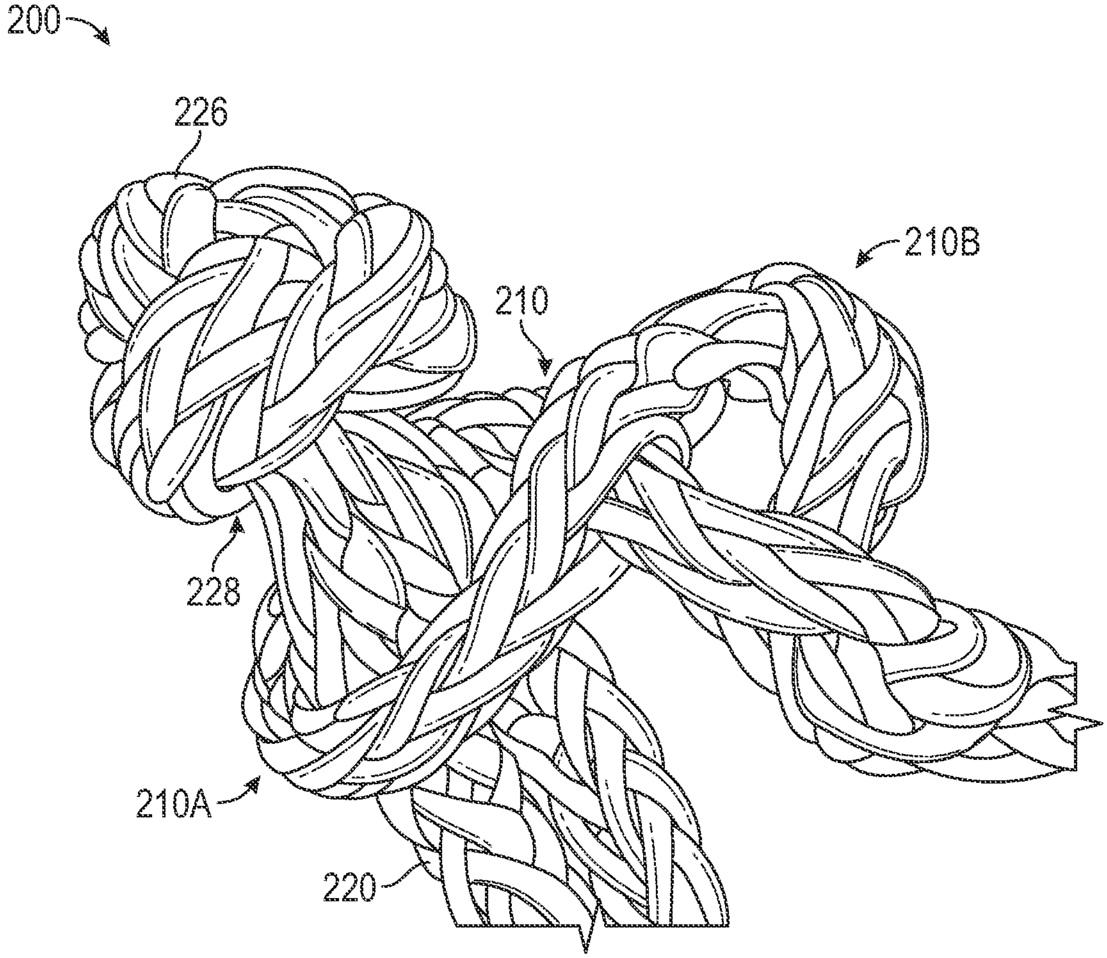
FIG. 11 is the choke partially assembled to the button knot.
Figure 12:
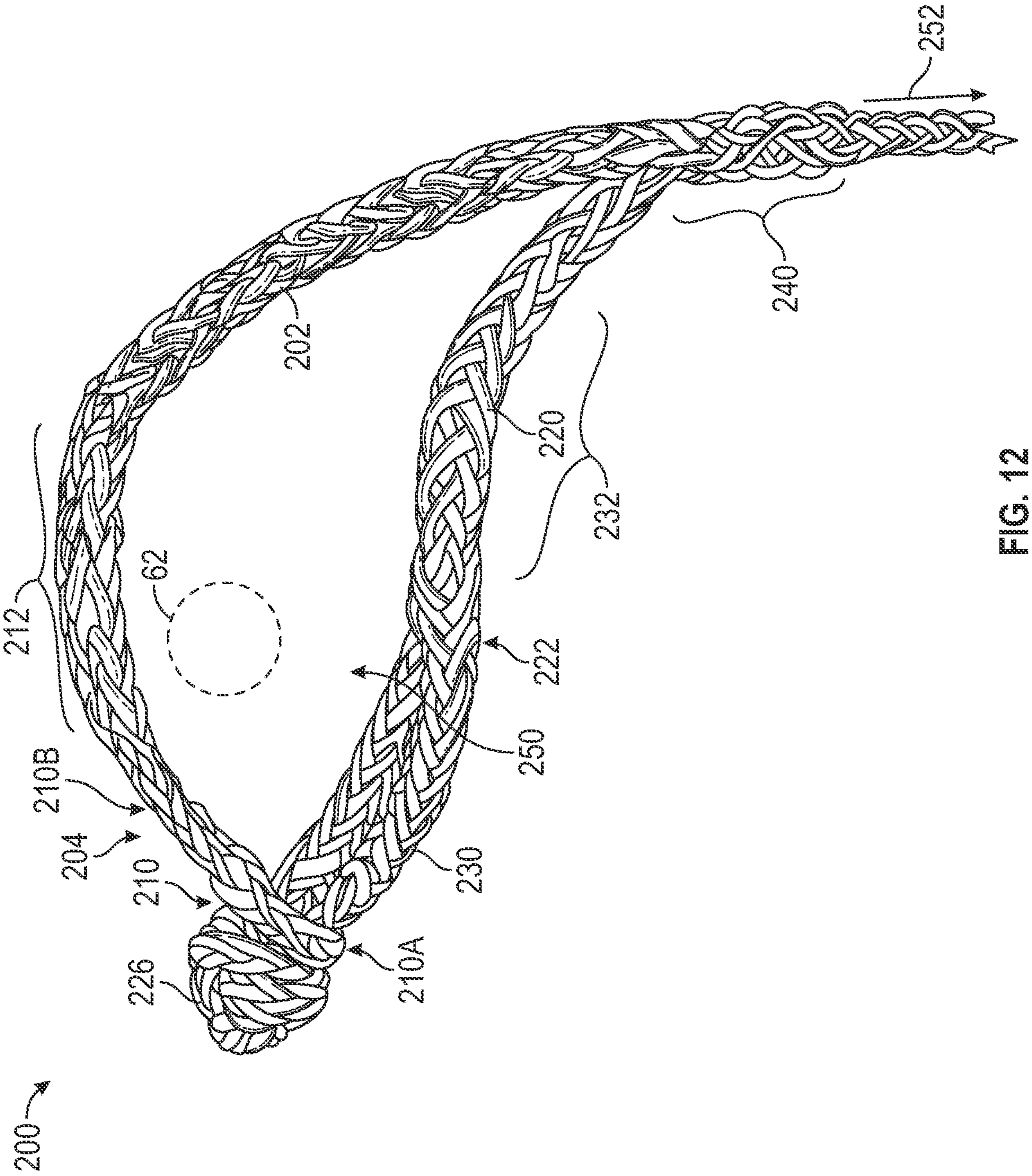
FIG. 12 is an elevational view of the choke assembled to the button knot in a pulling position.

Referring now to FIG. 11, the enlarged knot 226 is illustrated in further detail. The enlarged knot 226 has the retaining notch 228 adjacent to both the enlarged knot 226 and the second rope 220. The first choke 210 is illustrated with the first portion 210A having the enlarged knot 226 inserted therethrough. The first choke 210 may be pulled tight so that the retaining notch 228 has the loop 208 disposed therein. This is illustrated best in FIG. 12. In FIG. 12, a pulling loop 250 is formed between the first end 204 of the first loop and the third end 222 of the second loop bounded by the interwoven portion 240. The pulling loop 250 may be placed around an object such as tree. Likewise, the first end 204 of the first rope 202 may be placed through a D-ring that extends from a vehicle and thereafter the first choke 210 is placed over the enlarged knot 226. Winching force is applied in the direction illustrated by the arrow 252.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A hookless winch rope for securing to an object comprising:

a first rope having a first end and a second end, said first end comprising a first loop and comprising a choke; and a second rope separate from the first rope, said second rope comprising a third end and a fourth end, said third end comprising an enlarged knot forming an engagement notch receiving the first loop;

wherein the first rope and the second rope are joined by a first interwoven portion wherein the first loop comprises a first eye splice.

2. The hookless winch rope of claim 1 further comprising a second loop adjacent the enlarged knot.

3. The hookless winch rope of claim 2 wherein the second loop comprises a second eye splice.

4. The hookless winch rope of claim 1 wherein a first distance from the first interwoven portion to the first loop is greater than a second distance from the first interwoven portion to the enlarged knot.

5. The hookless winch rope of claim 4 wherein the first loop is formed by a second interwoven portion and a second loop adjacent the enlarged knot is formed by a third interwoven portion.

6. A winch system comprising: a winch; and the hookless winch rope of claim 1.

7. A hookless winch rope for securing to an object comprising: a first rope having a first end and a second end; and a second rope separate from the first rope, said second rope comprising a third end and a fourth end, said first end coupled to the third end with an enlarged knot, said fourth end comprising a first loop integrally formed therein, said first loop forming an opening with the object therein and said first loop retained on the enlarged knot.

8. The hookless winch rope of claim 7 wherein the enlarged knot comprises a button knot.

9. The hookless winch rope of claim 7 wherein the first end is tied to the third end with the enlarged knot.

10. The hookless winch rope of claim 7 wherein the enlarged knot and the first rope form a retaining notch therebetween.

11. The hookless winch rope of claim 10 wherein the retaining notch comprises a V-shape.

12. The hookless winch rope of claim 10 wherein the first loop engages the retaining notch during pulling.

13. The hookless winch rope of claim 7 wherein the second rope comprises a single rope at the third end and the first loop at the second end.

14. The hookless winch rope of claim 7 wherein the first loop and the knot form a second loop around the object.

15. A winch system comprising: a winch; and the hookless winch rope as recited in claim 7.

16. A hookless winch rope comprising:

a unitary portion and a first portion and a second portion extending from the unitary portion;

said first portion and said second portion forming a first loop by threading the first portion into the second portion at a first intersection;

said first portion forming a second loop by threading the second portion into the first portion at a second intersection;

said first portion and said second portion forming a third loop to be an enlarged knot formed by tying the first portion and the second portion; and said enlarged knot forming a retaining notch by engaging the first intersection or the second intersection at the retaining notch.

17. The hookless winch rope of claim 16 wherein the enlarged knot comprises a button knot.

* * * * *